(12) United States Patent
Liu

(10) Patent No.: US 9,440,336 B2
(45) Date of Patent: Sep. 13, 2016

(54) RATCHET WRENCH

(71) Applicant: Yi-Yong Liu, Taichung (TW)

(72) Inventor: Yi-Yong Liu, Taichung (TW)

( * ) Notice: Subject to any disclaimer, the term of this patent is extended or adjusted under 35 U.S.C. 154(b) by 339 days.

(21) Appl. No.: 14/301,355

(22) Filed: Jun. 11, 2014

(65) Prior Publication Data

US 2015/0298300 A1 Oct. 22, 2015

(30) Foreign Application Priority Data

Apr. 18, 2014 (TW) .............................. 103114110 A

(51) Int. Cl.
B25B 13/46 (2006.01)
B25B 13/08 (2006.01)
B25B 23/00 (2006.01)
F16D 41/16 (2006.01)

(52) U.S. Cl.
CPC ............ B25B 13/463 (2013.01); B25B 13/08 (2013.01); F16D 41/16 (2013.01)

(58) Field of Classification Search
CPC . B25B 13/463; B25B 23/0007; B25B 13/08; F16D 41/16
See application file for complete search history.

(56) References Cited

U.S. PATENT DOCUMENTS

| | | | | |
|---|---|---|---|---|
| 3,256,966 A * | 6/1966 | Angquist | ................ | F16D 41/16 192/43.1 |
| 3,269,496 A * | 8/1966 | Kilness | ................ | B25B 13/463 192/43.2 |
| 5,533,427 A * | 7/1996 | Chow | ................ | B25B 13/463 192/43 |
| 5,957,009 A * | 9/1999 | McCann | ............... | B25B 13/462 192/43 |
| 6,065,374 A * | 5/2000 | Taggart | ................ | B25B 13/463 81/63 |
| 6,435,062 B1 * | 8/2002 | McCann | ............... | B25B 13/463 81/60 |
| 6,516,692 B1 * | 2/2003 | Hsien | ................... | B25B 13/463 81/63 |
| 6,543,316 B2 * | 4/2003 | Daigle | ................. | B25B 13/463 81/63 |
| 6,575,060 B1 * | 6/2003 | Tseng | ................... | B25B 13/463 81/60 |
| 6,647,833 B1 * | 11/2003 | Wu | ........ | B25B 13/463 81/60 |
| 6,912,935 B2 * | 7/2005 | Hsien | .................... | B25B 13/463 192/43.2 |
| 6,971,287 B2 * | 12/2005 | Lee | ........ | B25B 13/463 81/60 |
| 6,988,429 B2 * | 1/2006 | Lee | ....... | B25B 13/463 81/60 |
| 7,059,219 B2 * | 6/2006 | Arnold | .................. | B25B 13/463 81/63 |
| 7,114,415 B1 * | 10/2006 | Chiang | ................. | B25B 13/463 81/60 |
| 7,237,460 B2 * | 7/2007 | Hu | ........ | B25B 13/463 192/43.2 |
| 8,113,092 B2 * | 2/2012 | Lee | ........ | B25B 13/463 81/63 |
| 8,261,635 B2 * | 9/2012 | Lee | ........ | B25B 13/463 81/60 |
| 8,960,054 B2 * | 2/2015 | Lin | ........ | B25B 13/463 81/63 |
| 9,016,174 B2 * | 4/2015 | Lee | ........ | B25B 13/463 81/60 |
| 2002/0189407 A1 * | 12/2002 | Mu-Lin | ................. | B25B 13/463 81/63.2 |
| 2003/0213342 A1 * | 11/2003 | Wu | ........ | B25B 13/463 81/60 |
| 2003/0221522 A1 * | 12/2003 | Wu | ........ | B25B 13/463 81/63.2 |
| 2006/0027049 A1 * | 2/2006 | Arnold | .................. | B25B 13/463 81/60 |
| 2007/0289414 A1 * | 12/2007 | Lee | ........ | B25B 13/463 81/60 |
| 2011/0162486 A1 * | 7/2011 | Lee | ........ | B25B 13/463 81/58.2 |

* cited by examiner

Primary Examiner — David B Thomas

(57) ABSTRACT

A ratchet wrench includes a body, a ratchet wheel, a pawl, a switch member and a resilient member. The body has three recesses to respectively accommodate the ratchet wheel, the pawl and the switch member. The pawl has a driving portion to be engaged with the toothed portion of the ratchet wheel. The pawl has a second engaging portion which is engaged with a first engaging portion of the ratchet wheel to position the ratchet wheel and the pawl in the two respective recesses respectively. The pawl has a protrusion which has a curved recess and a first stop. The switch member has a second stop, a reception recess and a hole. The protrusion is accommodated in the reception recess. The resilient member extends through the hole and the two ends of the resilient member contact the reception recess and the curved recess respectively.

12 Claims, 7 Drawing Sheets

RATCHET WRENCH

BACKGROUND OF THE INVENTION

1. Fields of the Invention

The present invention relates to a ratchet wrench, and more particularly, to a ratchet wrench composed of only five parts.

2. Descriptions of Related Art

U.S. Pat. No. 2,957,377 discloses a ratchet wrench having a body 10, a ratchet wheel 14, a pawl 19, a switch member 23 and a resilient member, wherein the body 10 has a first recess 13, a second recess 16 and a third recess 24. The ratchet wheel 14 is pivotably located in the first recess 13 and has a toothed portion 15. The pawl 19 is located in the second recess 16 and has a notch 27 in one side thereof and teeth 20 are formed on the other side of the pawl 19. The teeth 20 are engaged with the toothed portion 15. The switch member 23 is pivotably located in the third recess 24 and has a restriction recess 28. The resilient member 26 has one end received in the notch 27 and the other end of the resilient member 26 is located in the restriction recess 28. When the switch member 23 is rotated, the resilient member 26 is rotated an angle, and the pawl 19 is moved in the second recess 16 to control the rotational direction of the wrench. The resilient member 26 has one end received in the notch 27 and is restricted by the pawl 19. The other end of the resilient member 26 is located in the restriction recess 28 to restrict the switch member 23. A sealing member 41 is used to position the ratchet wheel 14 in the first recess 13, and a ring 37 is used to be mounted to the switch member 23 and to position the switch member 23 in the third recess 24. The assembling is difficult and the number of the required parts is plenty.

U.S. Pat. No. 6,282,992 discloses a ratchet wrench having a body 10, a ratchet wheel 20, a pawl 40, a switch member 50 and a resilient member 92. A spring hat 90 is mounted to the resilient member 92 and the spring hat 90 has one end received in the recess 42 of the pawl 40. The other end of the spring hat 90 is received in the restriction recess 521 of the switch member 50 to restrict the switch member 50 not to be disengaged from the third recess 15. The body 10 has a groove 131 and a clip 30 to position the ratchet wheel 20 in the first recess 13. However, the groove 131 has to be further made in the body 10, and the clip 30 and the spring hat 90 are individually made, the assembling processes are complicated. Besides, the switch member 50 is pivotably located in the third recess 15 and is not well positioned, so that the switch member 50 can be unintentionally pivoted to change the rotational direction of the ratchet wrench.

The present invention intends to provide a ratchet wrench to eliminate the shortcomings mentioned above.

SUMMARY OF THE INVENTION

The present invention relates to a ratchet wrench and comprises a body, a ratchet wheel, a pawl, a switch member and a resilient member. The body has a first recess, a second recess and a third recess so as to respectively accommodate the ratchet wheel, the pawl and the switch member. The pawl has a driving portion so as to be engaged with the toothed portion of the ratchet wheel. The pawl has a second engaging portion which is engaged with a first engaging portion of the ratchet wheel so as to position the ratchet wheel and the pawl in the first recess and the second recess respectively. The pawl has a protrusion on the rear side thereof and the protrusion has a curved recess and a first stop. The switch member has a second stop, a reception recess and a hole. The protrusion is accommodated in the reception recess, and the second stop is engaged with the first stop. The resilient member extends through the hole and the two ends of the resilient member contact the reception recess and the curved recess respectively.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
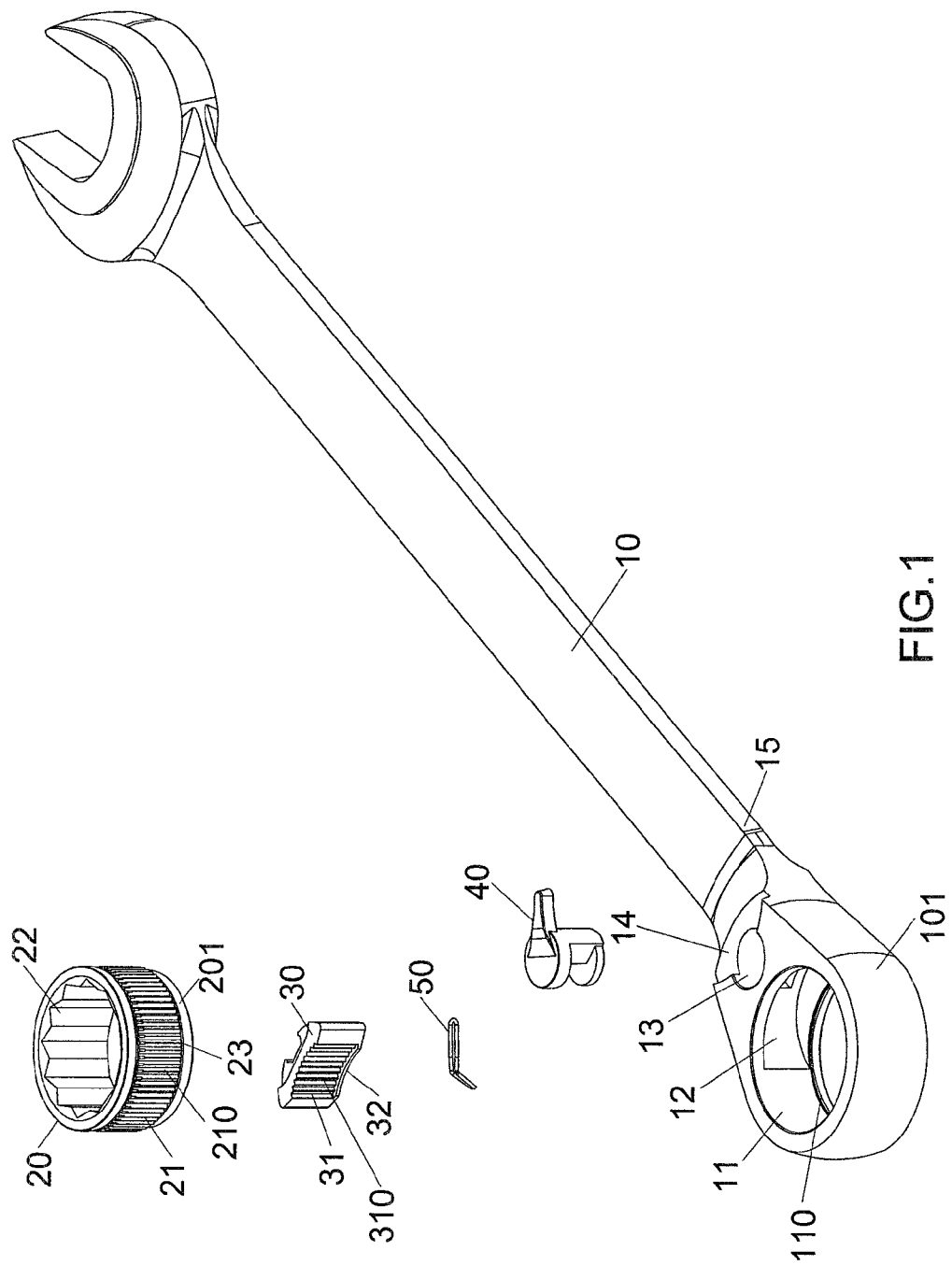
FIG. 1 is an exploded view of the ratchet wrench of the present invention.
Figure 6:
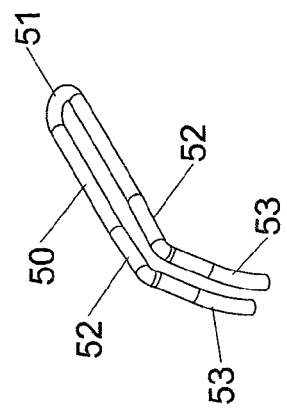
FIG. 6 is a perspective view of the resilient member of the ratchet wrench of the present invention.
Figure 3:
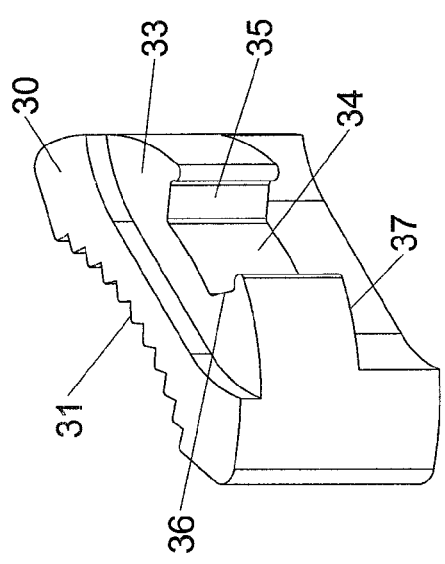
FIG. 3 is a side view of the pawl of the ratchet wrench of the present invention.
Figure 5:
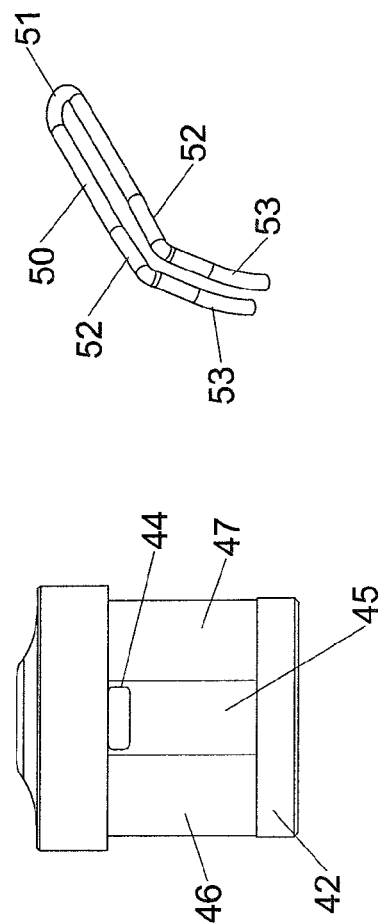
FIG. 5 is a front view of the switch member of the ratchet wrench of the present invention.

Referring to FIGS. 1 to 6, the ratchet wrench of the present invention comprises a body 10, a ratchet wheel 20, a pawl 30, a switch member 40 and a resilient member 50. The body 10 comprises a handle 15 and a function head 101 is connected to one end of the handle 15. The function head 101 has a first recess 11 defined therethrough, and a flange 110 extends inward from the inner periphery of the first recess 11. A second recess 12 is defined in the inner periphery of the first recess 11, and the center of the second recess 12 is located within the first recess 11. The second recess 12 has a closed top and a closed bottom. A third recess 13 is defined in the inner periphery of the second recess 12 and communicates through the top of the function head 101. An opening 14 is defined in the top of the function head 101 and communicates with the third recess 13.

The ratchet wheel 20 is rotatably located in the first recess 11 and has a toothed portion 21 defined in the outer periphery of the ratchet wheel 20. The toothed portion 21 has multiple teeth 210. A first engaging portion 23 is defined in the outer periphery of the ratchet wheel 20 and is a groove. The ratchet wheel 20 has a mounted portion 22 at the center thereof, in this embodiment, the mounting portion 22 is a multiple-sided hole so that an object is engaged with the multiple-sided hole and is rotated. A shoulder 201 is formed on the lower end of the ratchet wheel 20 and engaged with the flange 110 of the function head 101.

The pawl 30 is movably located in the second recess 12 and has a driving portion 31 and a second engaging portion 32 on the front side thereof. The driving portion 31 has multiple teeth 310 so as to be engaged with the toothed portion 21 of the ratchet wheel 20. The second engaging portion 32 is engaged with the first engaging portion 23 to position the ratchet wheel 20 in the first recess 11. The pawl 30 has a protrusion 33 extending from the rear side thereof. The second engaging portion 32 is located at the lower portion of the driving portion 31 and is a curved flange which is matched with the curvature of the first engaging portion 23. The length of the second engaging portion 32 is the same as the length of the driving portion 31 so as to provide sufficient engagement area between the ratchet wheel 20 and the pawl 30. The height of the protrusion 33 is shorter than that of the pawl 30. The protrusion 33 has a curved recess 34 which has a curved face connected between a first face 35 and a second face 36. A first stop 37 is formed at the underside of the protrusion 33.

The switch member 40 comprises a cylindrical member 41, a top plate and a second stop 42 extending respectively radially from the cylindrical member 41 so as to define a reception recess 43 between the top plate and the second stop 42. The protrusion 33 of the pawl 30 is located in the reception recess 43. The first stop 37 is rested on the second stop 42. The cylindrical member 41 is pivotably located in the third recess 13. The reception recess 43 includes a fourth face 46, a third face 45 and a fifth face 47, wherein the third face 45 is connected between the fourth face 46 and the fifth face 47. The third face 45 is located corresponding to the curved recess 34. The first face 35 is located corresponding to the fourth face 46. The second face 36 is located corresponding to the fifth face 47. A non-circular hole 44 is defined through defined through the third face 45 of the reception recess 43. A lever 48 extends radially from the top plate and accommodated in the opening 14 in the top of the function head 101 so that the user switches the lever 48 to control the movement of the pawl 0 in the second recess 12 to change the rotational direction of the ratchet wrench.

The U-shaped resilient member 50 extends through the hole 44 and has a bent portion 51, and two extensions 52 extend from the bent portion 51. The bent portion 51 contacts the inner periphery of the third recess 13. Each extension 52 has an end portion 53 on the distal end thereof. The end portions 53 protrude beyond the hole 44 and contact the curved face of the curved recess 34. The end portions 53 each is bent downward. When shifting the lever 48, the switch member 40 rotates the resilient member 50 an angle so that the resilient member 50 drives the pawl 30 to move left and right in the second recess 12.

Figure 7:
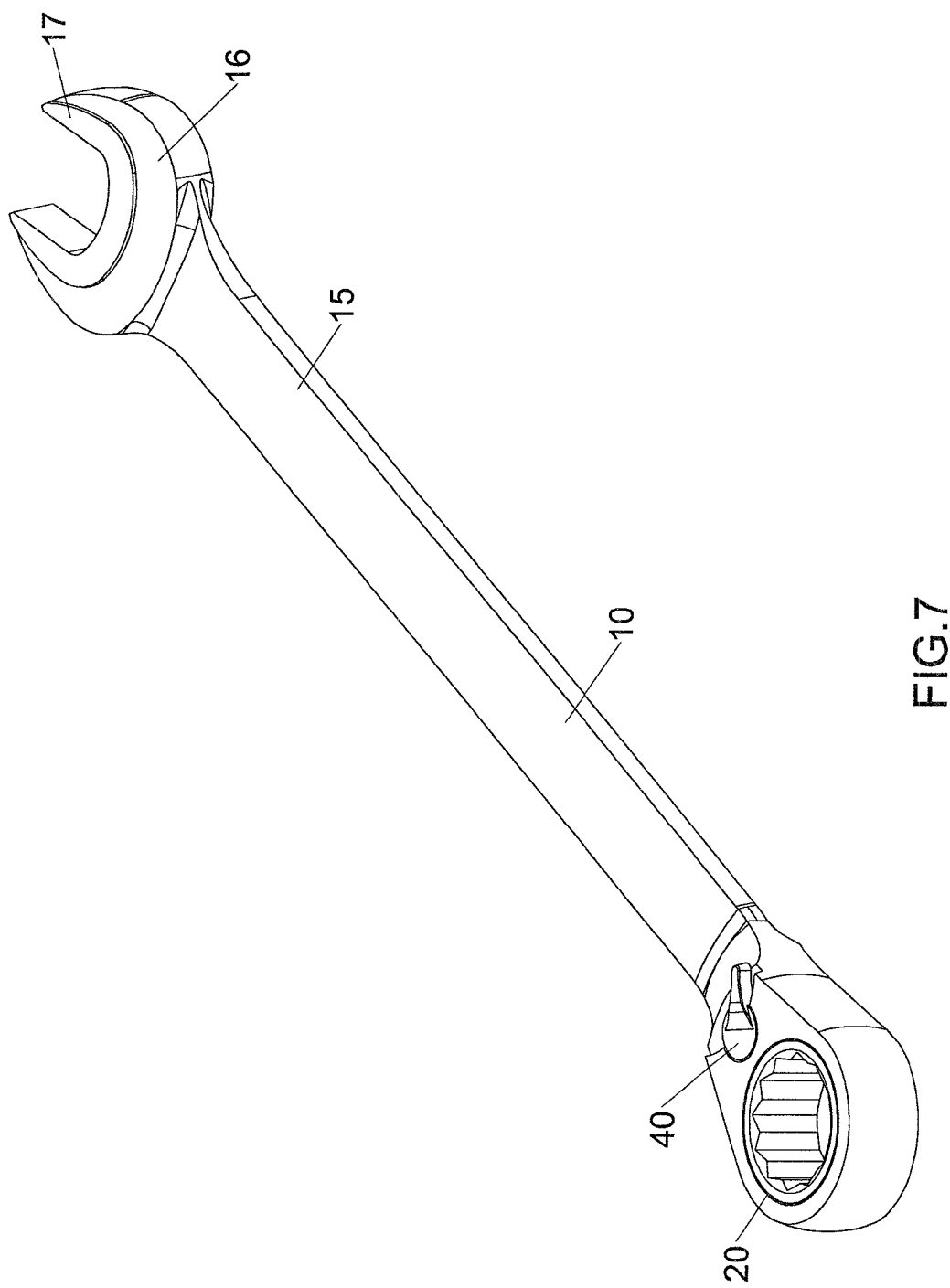
FIG. 7 is a perspective view of the ratchet wrench of the present invention.

As shown in FIG. 7, the handle 15 is used to be held by the user. Each of the two ends of the handle 15 has a function head 101 connected thereto, one of the function heads 101 and has the ratchet mechanism described above, and the other function head 101 is an open wrench head having a first layer 16 and a second layer 17. The first layer 16 is thicker than the thickness of the handle 15, and the second layer 17 protrudes from each of the two surfaces of the first layer 16. In other words, there are three steps which are the handle 15, the first layer 16 and the second layer 17.

Figure 9:
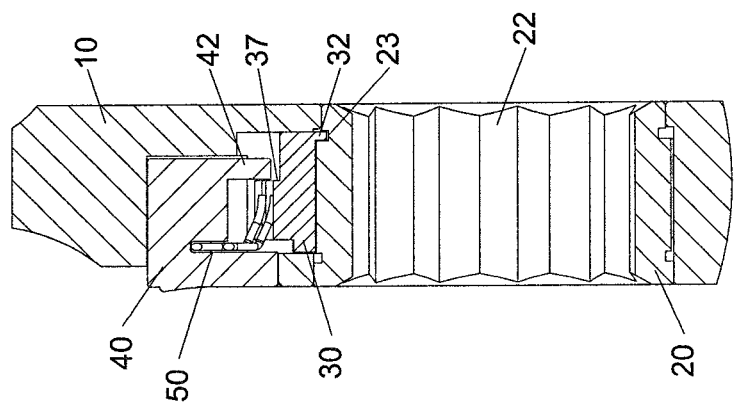
FIG. 9 is a cross sectional view, taken along line B-B in FIG. 8.
Figure 8:
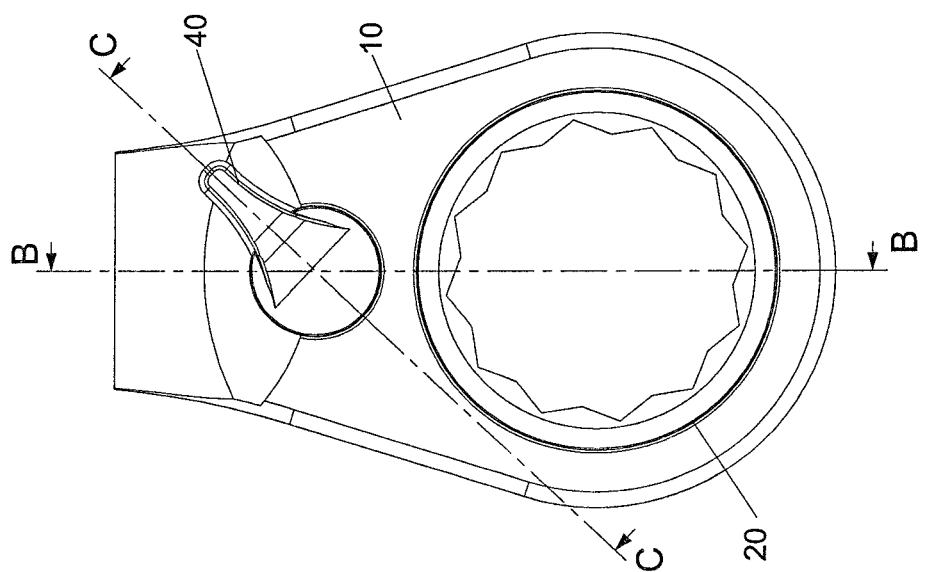
FIG. 8 is a top view of the ratchet wrench of the present invention.

As shown in FIGS. 8 and 9, the ratchet wheel 20 is rotatably received in the first recess 11 and the pawl 30 is located in the second recess 12. The driving portion 31 is engaged with the toothed portion 21, the first engaging portion 23 of the ratchet wheel 20 is engaged with the second engaging portion 32 of the pawl 30, so that the ratchet wheel 20 is rotatably received in the first recess 11 and does not drop therefrom. The switch member 40 is pivotably located in the third recess 13 of the body 10 and protrusion 33 of the pawl 30 is received in the reception recess 43 of the switch member 40. The first and second stops 37, 42 are in contact with each other to position the switch member 40 in the third recess 13 and does not drop from the third recess 13.

Figure 10:
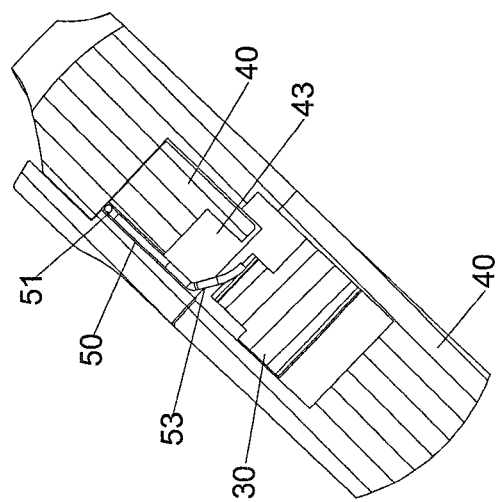
FIG. 10 is a cross sectional view, taken along line C-C in FIG. 8.

As shown In FIG. 10, the resilient member 50 extends through the hole 44 and has a bent portion 51. The bent portion 51 contacts the inner periphery of the third recess 13, in other words, friction is formed between the bent portion 51 and the inner periphery of the third recess 13. The end portions 53 are restricted in the curved recess 34. When the user shifts the lever 48, the end portions 53 move left and right to contact the first face 35 and the second face 36 of the pawl 30 to allow the ratchet wrench to rotate in two opposite directions.

Figure 11:
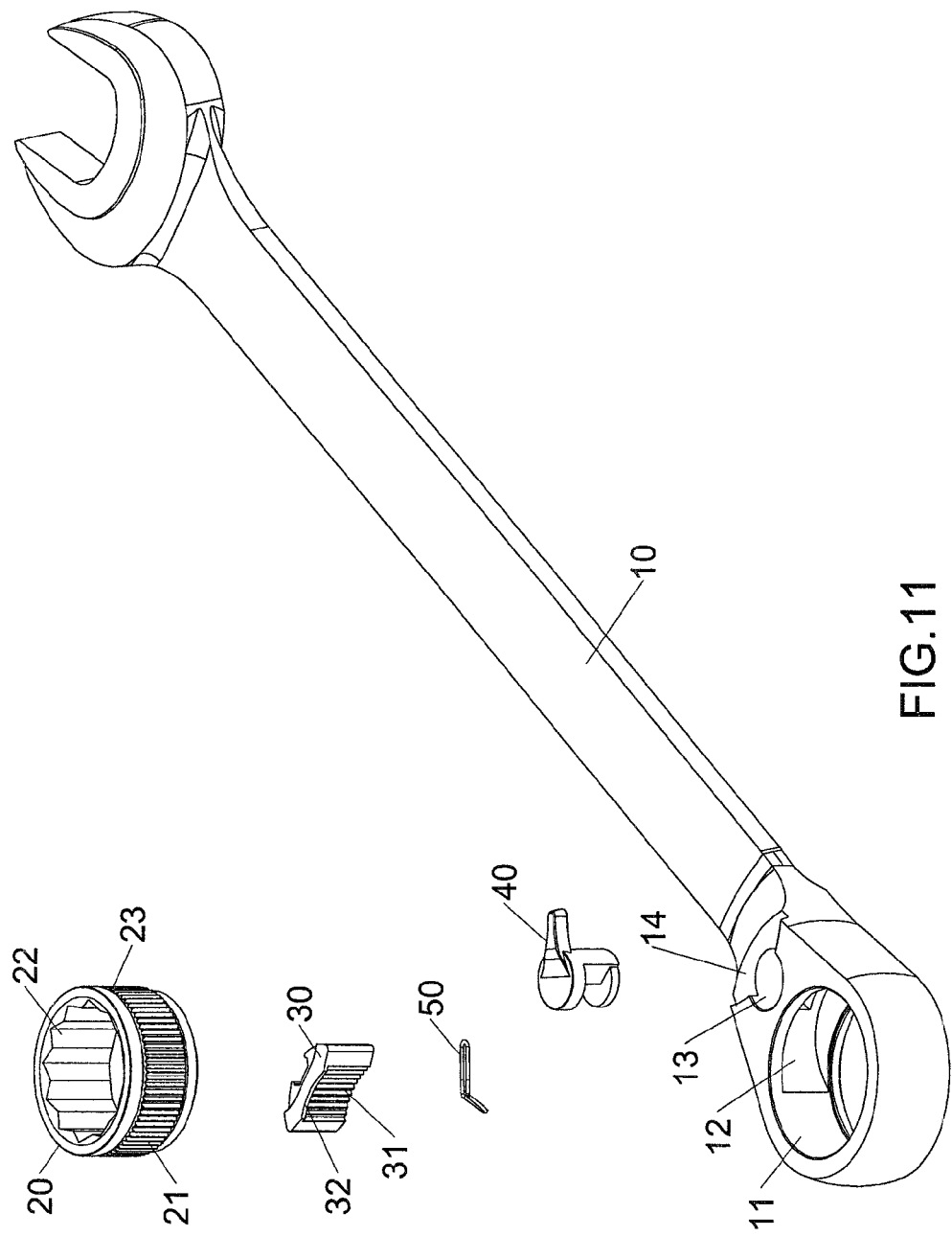
FIG. 11 is an exploded view of the second embodiment of the ratchet wrench of the present invention.

As shown in FIG. 11, the first engaging portion 23 is located at the upper portion of the toothed portion 21 of the ratchet wheel 20. The second engaging portion 32 is located at the upper portion of the driving portion 31.

Figure 12:
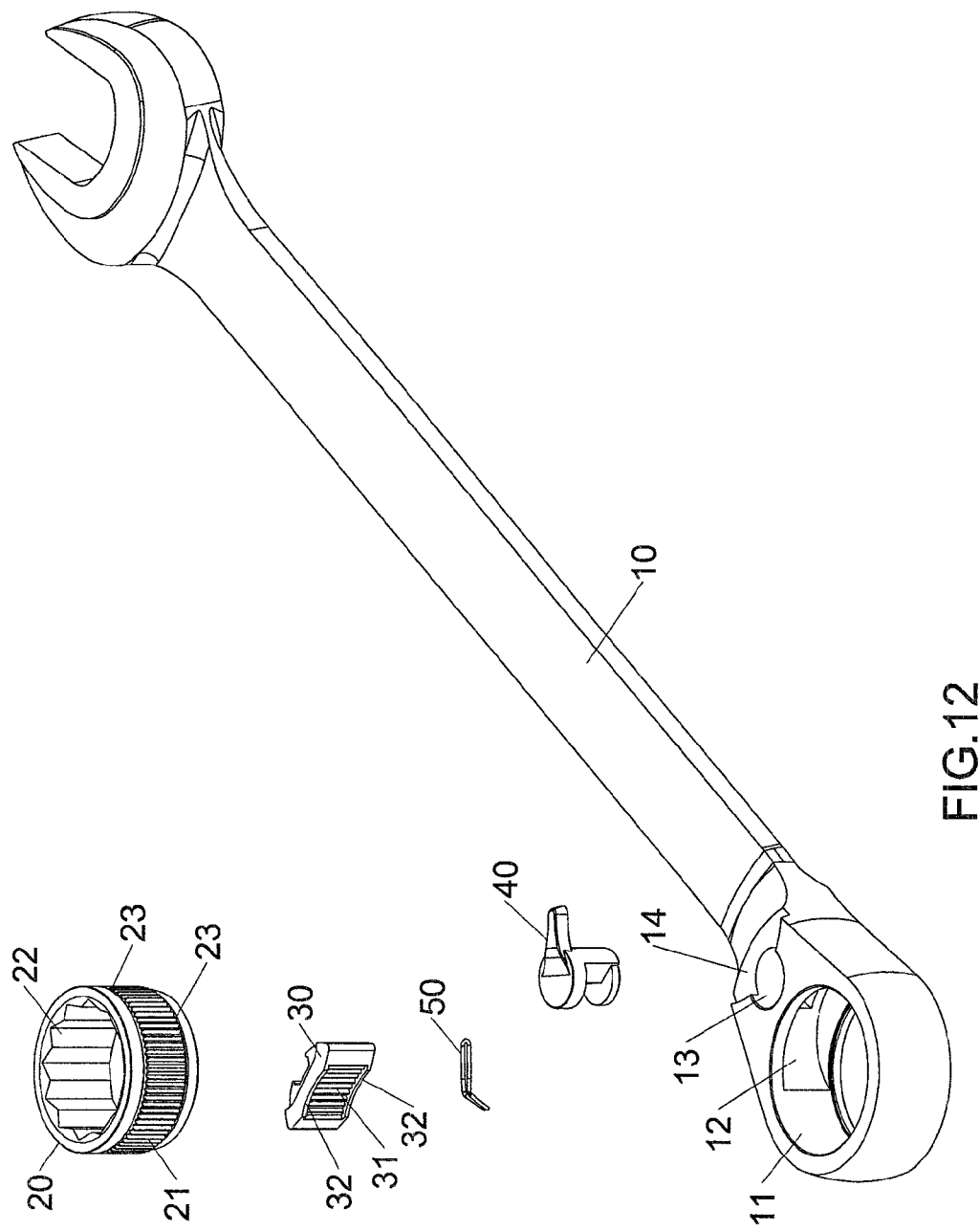
FIG. 12 is an exploded view of the third embodiment of the ratchet wrench of the present invention.

As shown in FIG. 12, the first engaging portion 23 is located at each of the upper portion and the lower portion of the toothed portion 21 of the ratchet wheel 20. The second engaging portion 32 is located at each of the upper portion and the lower portion of the driving portion 31.

Figure 13:
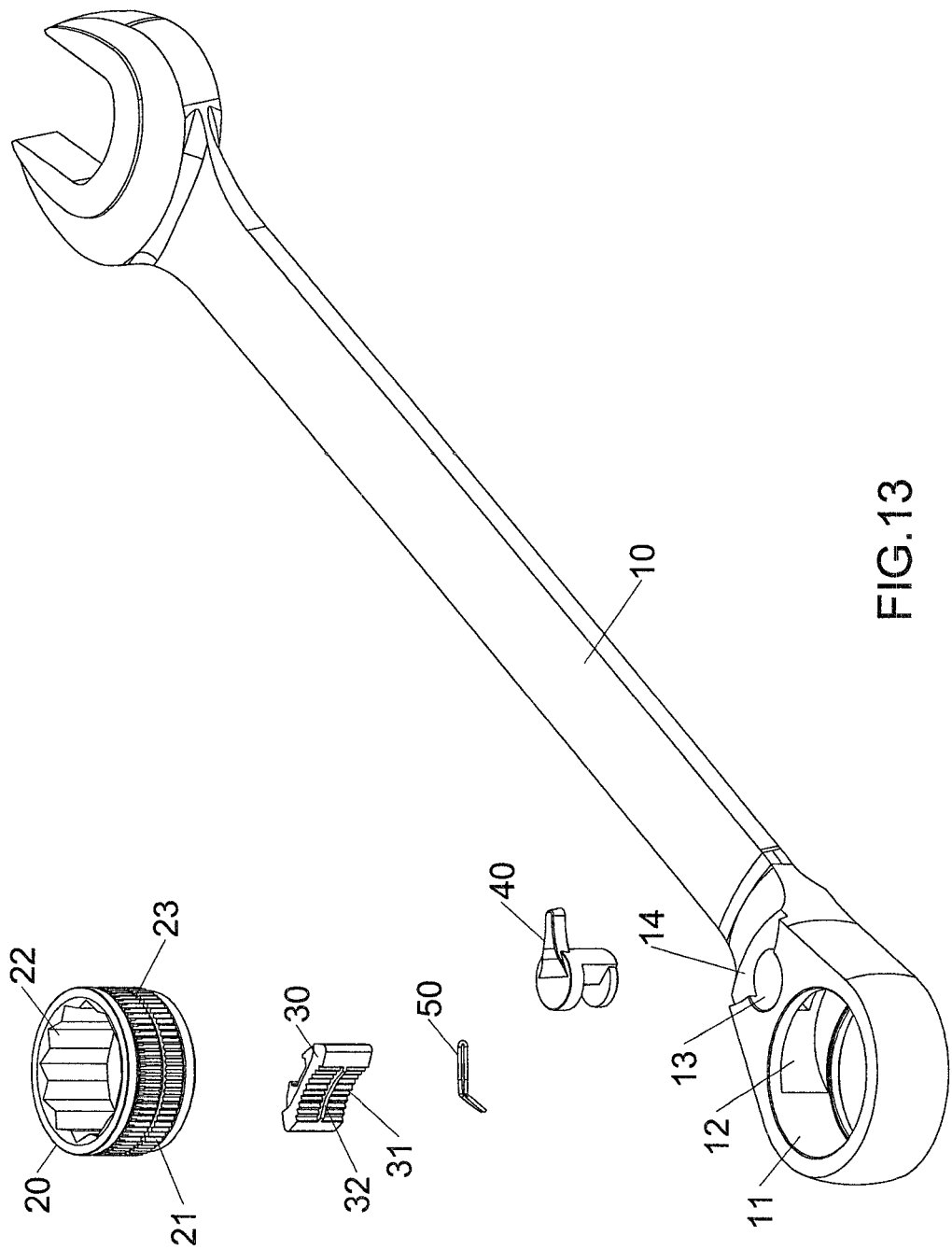
FIG. 13 is an exploded view of the fourth embodiment of the ratchet wrench of the present invention.

As shown in FIG. 13, the first engaging portion 23 is located at the mediate portion of the toothed portion 21 of the ratchet wheel 20, the second engaging portion 32 is located at the mediate portion of the driving portion 31.

As shown in FIGS. 1 to 6, the mounting portion 22 is a rectangular protrusion to be connected with a socket. The mounting portion 22 can be any known type. The body 10 does not have the opening 14 and the lever 48 of the switch member 40 is exposed outside of the body 10. The hole 40 of the switch member 40 is an oval hole. A bead is located between the bent portion 51 and the third recess 13, the bead is received in the hole 44 and biased by the resilient member 50.

The present invention only needs five parts which are the body 10, the ratchet wheel 20, the pawl 30, the switch member 40 and the resilient member 50. The less number of parts make the assembly to be simple and the accumulated tolerance is smaller than the conventional wrench.

Figure 2:
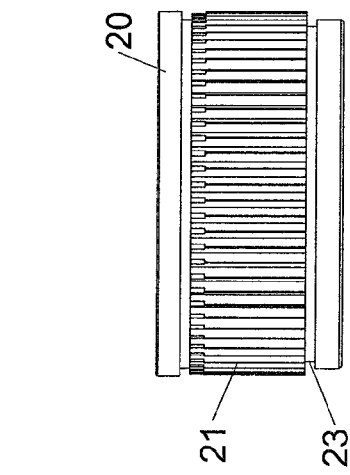
FIG. 2 is a side view of the ratchet wheel of the ratchet wrench of the present invention.
Figure 4:
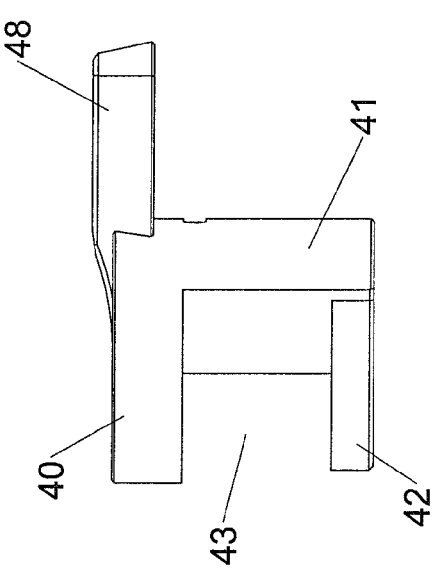
FIG. 4 is a side view of the switch member of the ratchet wrench of the present invention.

As shown in FIGS. 2 and 9, the first engaging portion 23 is engaged with the second engaging portion 32 to restrict the ratchet wheel 20 in the first recess 11. The switch member 40 is pivotably located in the third recess 13. The protrusion 33 of the pawl 30 is received in the reception recess 43. The first stop 37 contacts the second stop 42 to restrict the switch member 40 in the third recess 13.

The pawl 30 restrict the rotation of the ratchet wheel 20, and the switch member 40 is connected to the body 10 to make the ratchet wrench to have only five parts. The bent portion 51 extends through the hole 44 and contacts the inner periphery of the third recess 13 to generate friction between the bent portion 51 and the inner periphery of the third recess 13. A resistance is formed when switching the switch member 40 so that the switch member 40 will not be pivoted randomly.

The body 10 of the present invention does not need the groove in the body as disclosed in U.S. Pat. No. 6,282,992 to reduce the manufacturing cost.

While we have shown and described the embodiment in accordance with the present invention, it should be clear to those skilled in the art that further embodiments may be made without departing from the scope of the present invention.

What is claimed is:

1. A ratchet wrench comprising:

a body having a handle and a function head connected to an end of the handle, the function head having a first recess defined therethrough, a flange extending inward from an inner periphery of the first recess, a second recess defined in the inner periphery of the first recess, a center of the second recess located within the first recess, the second recess having a closed top and a closed bottom, a third recess defined in an inner periphery of the second recess and communicating through a top of the function head, an opening defined in the top of the function head and communicating with the third recess;

a ratchet wheel rotatably located in the first recess and having a toothed portion defined in an outer periphery of the ratchet wheel, the toothed portion having multiple teeth, a first engaging portion defined in the outer periphery of the ratchet wheel and being a groove, the ratchet wheel having a mounted portion at a center thereof, a shoulder formed on a lower end of the ratchet wheel and engaged with the flange of the function head;

a pawl movably located in the second recess and having a driving portion and a second engaging portion on a front side thereof, the driving portion having multiple teeth so as to be engaged with the toothed portion of the ratchet wheel, the second engaging portion being engaged with the first engaging portion to position the ratchet wheel in the first recess, the pawl having a protrusion extending from a rear side thereof, a height of the protrusion being shorter than that of the pawl, the protrusion having a curved recess which has a curved face connected between a first face and a second face, a first stop formed at an underside of the protrusion;

a switch member being a cylindrical member, a top plate and a second stop extending radially from the cylindrical member, a reception recess defined between the top plate and the second stop, the protrusion of the pawl located in the reception recess, the first stop rested on the second stop, the cylindrical member pivotably located in the third recess, a hole defined through an inner wall of the reception recess, a lever extending radially from the top plate and accommodated in the opening in the top of the function head, and a U-shaped resilient member extending through the hole and having a bent portion and two extensions extending from the bent portion, the bent portion contacting an inner periphery of the third recess, each extension having an end portion on a distal end thereof, the end portions protruding beyond the hole and contacting the curved recess.

2. The wrench as claimed in claim 1, wherein the mounting portion is a multiple-sided hole.

3. The wrench as claimed in claim 1, wherein the mounting portion is a rectangular protrusion.

4. The wrench as claimed in claim 1, wherein the first engaging portion is located at a lower portion of the toothed portion of the ratchet wheel, the second engaging portion is located at a lower portion of the driving portion.

5. The wrench as claimed in claim 1, wherein the first engaging portion is located at an upper portion of the toothed portion of the ratchet wheel, the second engaging portion is located at an upper portion of the driving portion.

6. The wrench as claimed in claim 1, wherein the first engaging portion is located at a mediate portion of the toothed portion of the ratchet wheel, the second engaging portion is located at a mediate portion of the driving portion.

7. The wrench as claimed in claim 1, wherein the first engaging portion is located at each of an upper portion and a lower portion of the toothed portion of the ratchet wheel, the second engaging portion is located at each of an upper portion and a lower portion of the driving portion.

8. The wrench as claimed in claim 1, wherein the hole of the switch member is a non-circular hole.

9. The wrench as claimed in claim 1, wherein the reception recess includes a fourth face, a third face and a fifth face, the third face is connected between the fourth face and the fifth face, the third face is located corresponding to the curved recess, the first face is located corresponding to the fourth face, the second face is located corresponding to the fifth face.

10. The wrench as claimed in claim 1, wherein each of the end portions is a curved portion.

11. The wrench as claimed in claim 1, wherein the hole of the switch member is an oval hole.

12. The wrench as claimed in claim 1, wherein a bead is located between the bent portion and the third recess, the bead is received in the hole and biased by the resilient member.

* * * * *